United States Patent [19]
Naito

[11] 3,751,153
[45] Aug. 7, 1973

[54] PROJECTOR

[75] Inventor: Morihisa Naito, Moriguchi, Japan

[73] Assignee: Matsushita Electric Industrial Co., Ltd., Kadoma-shi, Osaka, Japan

[22] Filed: Sept. 8, 1970

[21] Appl. No.: 70,161

[30] Foreign Application Priority Data
Sept. 18, 1969 Japan.............................. 44/75618
Sept. 18, 1969 Japan.............................. 44/75619
Sept. 18, 1969 Japan.............................. 44/75620
Sept. 18, 1969 Japan.............................. 44/75621
Sept. 18, 1969 Japan.............................. 44/90389

[52] U.S. Cl.................. 353/27, 353/108, 353/120, 355/40
[51] Int. Cl...................... G03b 23/08, G03b 21/00
[58] Field of Search................... 353/27, 120, 108, 353/110, 68, 19, 15; 355/40, 42, 41, 43

[56] References Cited
UNITED STATES PATENTS
1,563,183  11/1925  Goodwin............................ 353/108
3,323,373  6/1967  Murray et al......................... 353/27
2,540,872  2/1951  Fleischer............................ 353/110

Primary Examiner—Louis R. Prince
Assistant Examiner—Steven L. Stephan
Attorney—Stevens, Davis, Miller & Mosher

[57] ABSTRACT

A projector wherein a magazine adapted to hold two or more rows of projectable films, each having a series of frames therein, is mounted on a movable plate in such a manner as to be movable in a first direction, that is, the longitudinal direction of the films as mounted in said magazine, said movable plate being movable in a second direction, that is, the direction perpendicular to said first direction, and the frames of said films are projected one after another successively on movement of said magazine in the first direction, movement of said movable plate in the second direction and return movement of said magazine in a direction opposite to said first direction.

6 Claims, 8 Drawing Figures

M. NAITO
INVENTOR

PROJECTOR

The present invention relates to a projector for projecting a plurality of frames of projectable films one after another successively, using a magazine which is adapted to hold the films, for example, in two rows.

In a conventional projector for projecting a film having a series of frames, it has been necessary to feed each frame to a projecting position by manual operation. Therefore, when a magnetic tape recorder or the like is used in combination with the projector to provide an explanation of each frame being projected, by reproducing a magnetic tape previously recorded with the explanation, it has frequently been experienced that the explanation reproduced by the magnetic tape recorder does not correctly coincide with the picture being projected, requiring the operator to adjust the position of the magnetic tape or the film every time such discrepancy occurs. Thus, the conventional projector has been quite unsatisfactory in operability.

The object of the present invention is to provide a projector which obviates such disadvantages of the conventional one as described above.

The present invention will be described in detail hereinafter with reference to the accompanying drawings, in which.

Figure 1:
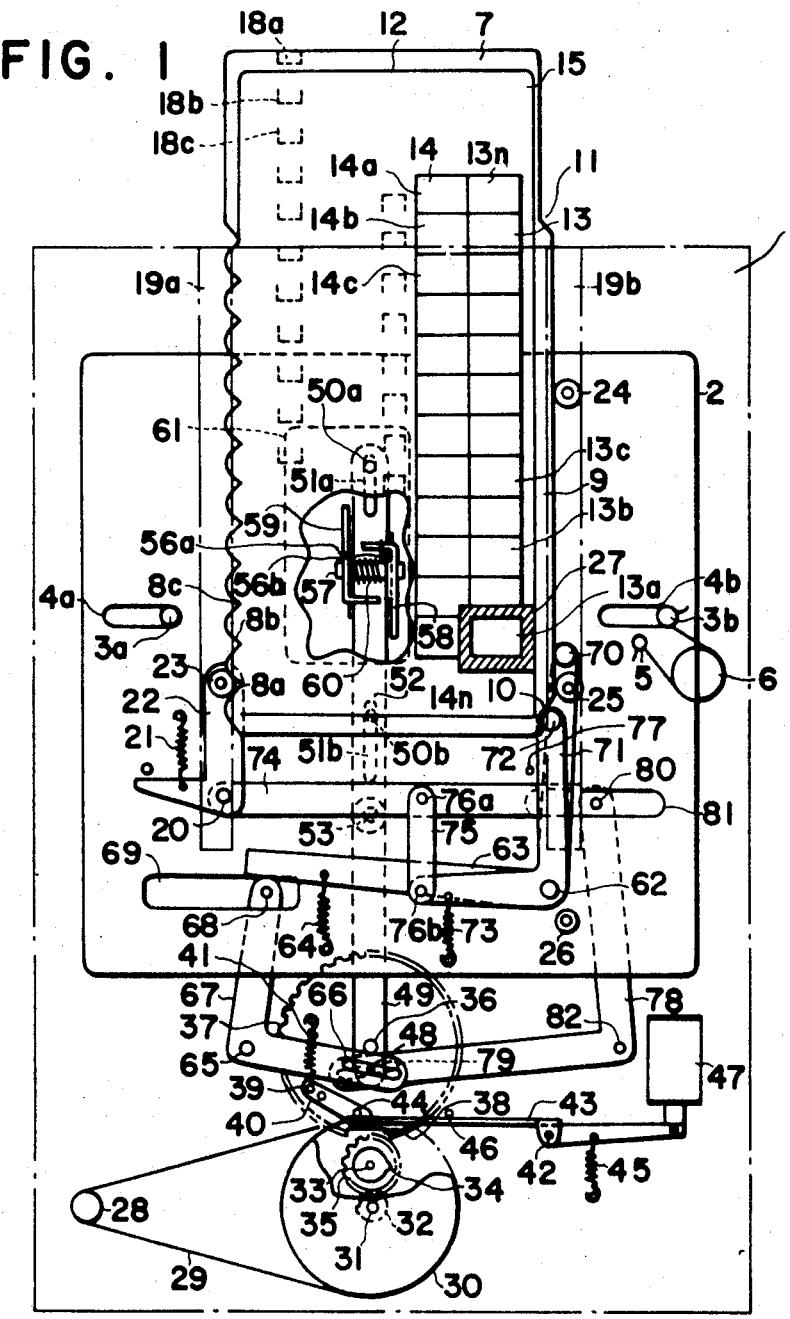
FIG. 1 is a top plan view showing the mechanism of an embodiment of the projector according to the present invention.

The projector according to the present invention includes a base plate 1 on which a movable plate 2 is laterally movably mounted, with pins 3a, 3b, fixed on said base plate 1, being received in slots 40a, 4b formed in said movable plate 2, respectively. The movable plate 2 is biased in one direction and held in position by a spring 6 which has one end anchored to a pin 5, provided on said movable plate 2, with the other end anchored to the pin 3b on the base plate 1.

A magazine 7 is rectangular in shape and has a plurality of nothces 8a, 8b, 8c — formed successively in one longitudinal edge thereof at a predetermined interval between each other. The other longitudinal edge of the magazine 7 is formed with an elongate projection 9 at the central portion thereof and hence the portions of the edge on both sides of said elongate projection 9 are recessed as at 10, 11.

Figure 8:
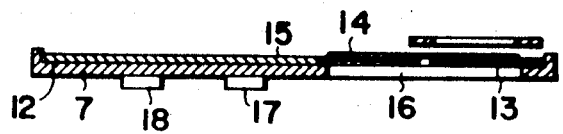
FIG. 8 is a cross-sectional view of the magazine with the film holder mounted thereon.

In the depression 12 formed on the upper surface of the magazine 7 is fitted a film holder 15 as shown in FIG. 8, which is adapted to hold two rows of film 13, 14, each having a plurality of frames 13a, 13b, 13c — or 14a, 14b, 14c — therein, and an opening 16 is formed in the magazine 7 at a location corresponding to the films 13, 14.

On the underside of the magazine 7 are formed two rows of aligned oblique projections 17a, 17b, 17c — and 18a, 18b, 18c —, the numbers of which are one smaller than the numbers of the frames 13a, 13b, 13c — and 14a, 14b, 14c — of the films 13, 14 respectively. The magazine 7 is mounted on the movable plate 2 in such a manner that it is slidable in the longitudinal direction by being guided by a pair of opposed guides 19a, 19b provided on said movable plate 2. With the magazine 7 mounted on the movable plate 2, a roller 23 carried on a lever 22 is received in one of the notches 8a, 8b, 8c — of said magazine 7 to securely hold said magazine in its selected position, said lever 22 being pivotally mounted on the base plate 1 by a pin 20 and urged in one direction by a spring 21.

For moving the magazine 7, therefore, it is only necessary to push the magazine, forcing the roller 23 outwardly against the biasing force of the spring 21 and causing it to ride over the adjacent lobe formed between the notch, e.g. the notch 8a, in which it has been received, and the adjacent notch. In order to facilitate the movement of the magazine 7, in this case, guide rollers 24, 25, 26 are provided on the movable plate 2 for guiding the elongate projection 9 of said magazine.

A mask 27 is provided at such a location that, when the magazine 7 is securely held in a selected position by the roller 23, one of the frame of the film 13 or 14 is positioned in register with said mask.

A pulley 30 is rotatably mounted on the base plate 1 by a pin 31. This pulley 30 is driven from a motor pulley 28 through a belt 29 and has a gear 32 provided thereon integrally therewith. The gear 32 is meshing with a gear 35 which is rotatably mounted on the base plate 1 by a pin 33 and has a projection 34 formed at a portion thereof.

A gear 37 is rotatably mounted on the base plate 1 by a pin 36 at a location engageable with the gear 35. The gear 37 has a notch 38 formed at a portion of the peripheral edge thereof and, in the normal condition, the gear 37 is held out of engagement with the gear 35, with the latter being received in the notch 38 formed in the former.

A pawl lever 40 is rotatably mounted on the gear 37 at one end portion thereof by a pin 39, and is biased by a spring 41 with the other end thereof extending into the notch 38 of said gear 37 for engagement with the gear 35. A lever 43 is pivotally mounted on the base plate 1 at the central portion thereof by a pin 42. One end of the lever 43 is normally held in engagement with a pin 44 provided on the pawl lever 40, to keep said pawl lever 40 out of engagement with the gear 35.

Namely, the lever 43 is urged to rotate in a clockwise direction by a spring 45 and, while the rotation of the lever 43 is limited by a pin 46 provided on the base plate 1, one end of said lever 43 is in engagement with the pin 44 of the pawl lever 40, preventing the pivotal movement of said pawl lever 40.

The other end of the lever 43 is connected to a solenoid plunger 47. The arrangement is such that, when the solenoid plunger 47 is actuated, the lever 43 is caused to make a pivotal movement in a counterclockwise direction against the biasing force of the spring 45, so that the pawl lever 40 is set free and brought into engagement with the gear 35 at the other end thereof.

A lever 49 has one end pivotally connected to a pin 48 provided at a portion of the gear 37, with the other end connected to one end of a sliding lever 52 by a pin 53, which sliding lever 52 is slidable in the longitudinal direction thereof, with pins 50a, 50b, fixed on the base plate 1, being received in slots 51a, 51b formed in said sliding lever respectively.

Figure 7:
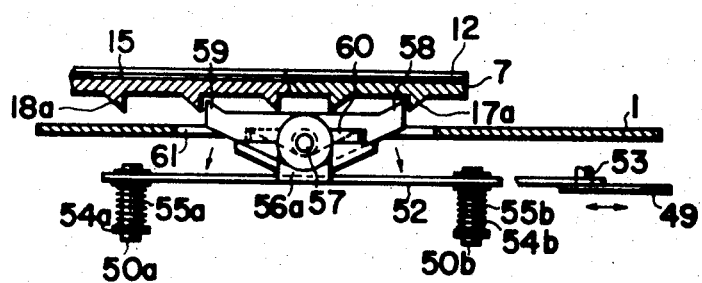
FIG. 7 is a vertical cross-sectional side view of the essential portion of the mechanism.

As shown in FIG. 7, the sliding lever 52 is constantly urged upwardly by springs 55a, 55b which are provided around the pins 50a, 50b between said sliding lever 52 and stopper rings 54, 54b provided at the lower ends of said pins 50a, 50b, respectively. Projections 56a, 56b are formed on the sliding lever 52, extending from the central portions of the longitudinal edges thereof and a pin 57 is journaled in said projections 56a, 56b. On the pin 57 are rotatably mounted driving pawl members 58, 59 which extend upwardly through an opening 61 formed in the base plate 1, for engagement with the oblique projections 17a, 17b, 17c — and 18a, 18b, 18c — of the magazine 7 respectively. These driving pawl members 58, 59 are respectively biased by a spring 60 such that the portions thereof, which are to be brought into engagement with the oblique projections of the magazine 7, are urged upwardly.

An L-shaped lever 63 is pivotally mounted on the movable plate 2 by a pin 62, and is urged to rotate in a counterclockwise direction by a spring 64, with a pin 70, provided at one end thereof, being held in pressure contact with that one of the longitudinal edges of the magazine 7 where the elongate projection 9 is formed. The other end of the lever 63 extends for engagement with a pin 68 provided at one end of a swing lever 67, through a slot 69 formed in the movable plate 2, said swing lever 67 being pivotally mounted on the base plate 1 by a pin 65, with the other end thereof in engagement with the gear 37 with the pin 48 on the latter being received in a slot 69 formed in the former.

Another swing lever 71 is pivotally mounted on the pin 62 on the movable plate 2 and biased by a spring 73 to rotate in a counterclockwise direction so that a pin 72 provided at one end thereof may be urged against the longitudinal edge of the magazine 7, similar to the pin 70 of the lever 63. The other end of the lever 71 is connected to the central portion of a lever 74 through a link 75 and pins 76a, 76b, which lever 74 is pivotally mounted on the pin 20 at one end thereof. Reference numeral 77 designates a stopper pin to limit the rotation of the levers 63, 71.

An L-shaped lever 78 is pivotally mounted at its central portion on the base plate 1 by a pin 82 and has a slot 79 formed at one end thereof, which is in engagement with the pin 48 on the gear 37. A pin 80 provided at the other end of the lever 78 extends through a slot 81 formed in the movable plate 2, for engagement with the other end of the lever 74.

Figure 6:
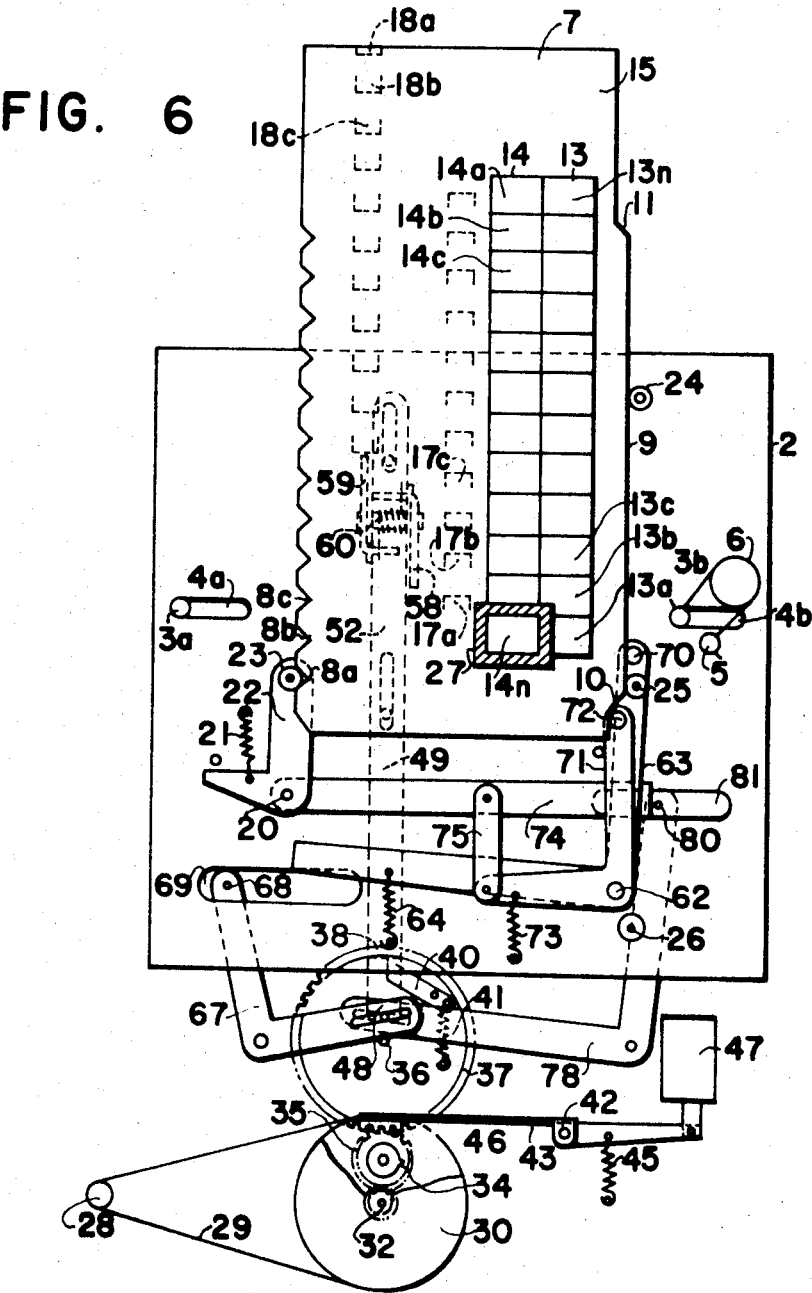

The projector constructed as described above will operate in the following manner:

FIG. 1 shows the state wherein the respective component parts are held stationary and the film holder 15, holding the films 13, 14, is mounted on the magazine 7 which is positioned between the guides 19a, 19b on the movable plate 2, preparatory to projection. In this state, the frame 13a of the film 13 is in register with the mask 27, to be projected. On the other hand, the driving pawl 58 is in a position engageable with the oblique projection 17a of the magazine, (17a shown in FIG. 6), whereas the driving pawl 59 is in a position not engageable with any of the oblique projections.

Figure 2:
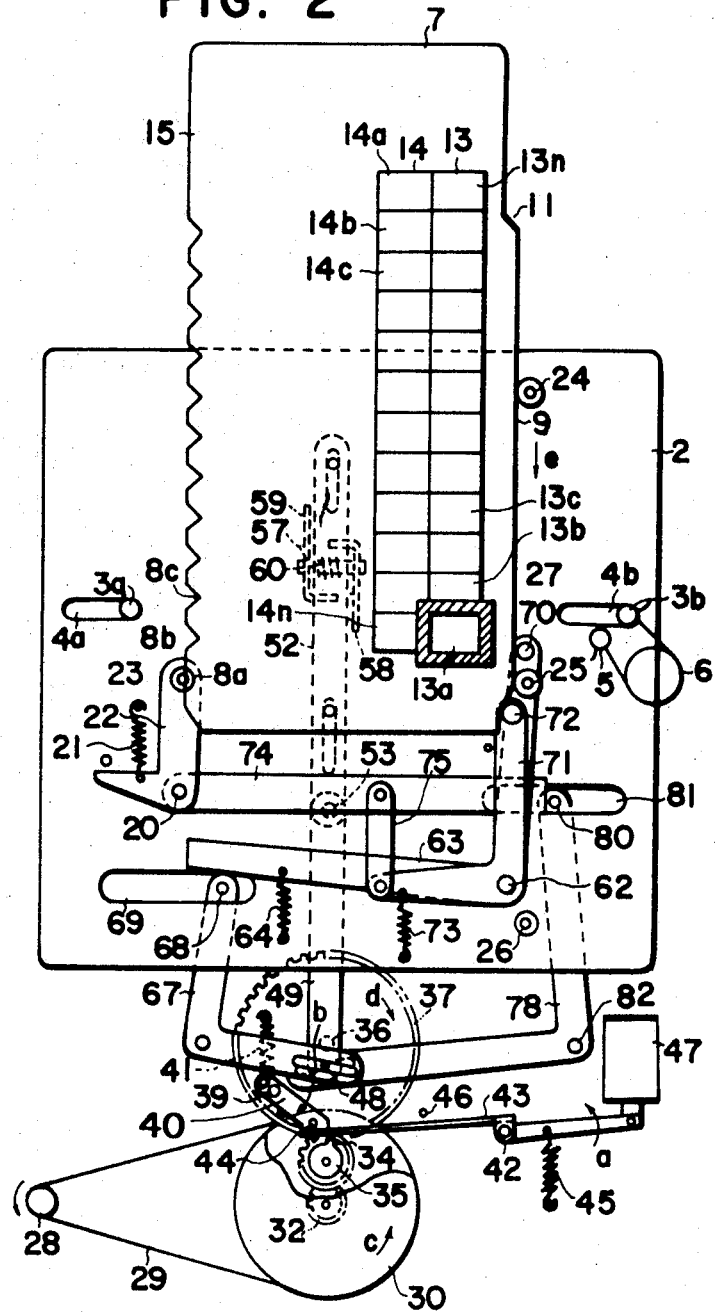
FIGS. 2, 3, 4, 5 and 6 are top plan views showing the positions of the mechanism in different stages of its operation respectively.

Under such condition, the first frame 13a of the film 13 is projected on a screen through the mask 27 by an optical system (not shown). When the solenoid plunger 47 is actuated manually or automatically in response to a film feed signal emitted from a magnetic tape recorder or the like, the lever 43 is caused to make a pivotal movement about the pin 42 in the direction of the arrow a, as shown in FIG. 2, against the biasing force of the spring 45, so that the pawl lever 40 is set free and pivotally moved in the direction of the arrow b under the biasing force of the spring 41, with the tip end thereof engaging the gear 35.

In this case, the gear 35 is rotated in the same direction by the pulley 30 which is rotated in the direction of the arrow c from the motor pulley 28. Therefore, the projection 34 of the gear 35 engages the pawl lever 40 to push the same, so that the gear 37 is rotated in the direction of the arrow d and brought into meshing engagement with the gear 35, due to displacement of the notch 38 of the gear 37 relative to the gear 35. Thus, the gear 37 continues to rotate in the direction of the arrow d.

The gear 37 stops its rotation upon completion of one complete revolution, when the notch 38 is again located at the position of the gear 35 to receive the same. By the one complete revolution of the gear 37, the lever 49 connected to the pin 48 is caused to make one reciprocal motion and hence the sliding lever 52 is also caused to make one reciprocal motion. Therefore, the driving pawls 58 and 59 are also caused to make one reciprocal motion and the driving pawl 58 rides over the oblique projection 17a on its onward stroke and engages the same on its return stroke, thereby pulling the magazine 7 in the direction of the arrow e. As a result, the magazine 7 is shifted from the position wherein the roller 23 is in engagement to the notch 8a to the position wherein the same is in engagement with the notch 8b, and securely held in that position by said roller.

The film 13 is also shifted incident to the movement of the magazine 7 and the frame 13b is positioned in register with the mask 27 to be projected.

The lever 67 is also caused to make a pivotal movement by the rotation of the gear 37. However, since the lever 63 is in the state of being rotated in a clockwise direction against the biasing force of the spring 64, due to the pin 70 thereof resting on the elongate projection 9 of the magazine 7, the lever 63 is held out of engagement with the pin 68 and hence no motion is transmitted between these two levers.

On the other hand, the lever 78 is also caused to make a pivotal movement, similar to the lever 67 but will not be brought into engagement with the lever 74, the pin 80 thereof only making a reciprocal motion rightwardly of the position shown in FIG. 1, and hence no motion is transmitted between these levers either.

Then, the solenoid plunger 47 is actuated again, whereupon the gear 37 is rotated again, and the magazine 7 is shifted in the direction of the arrow e by the driving pawl 58, in the same manner as described above, and held in position stably by the roller 23 which is now received in the notch 8c. Thus, the frame 13c of the film 13 is located in the position of the mask 27 and projected.

Figure 3:
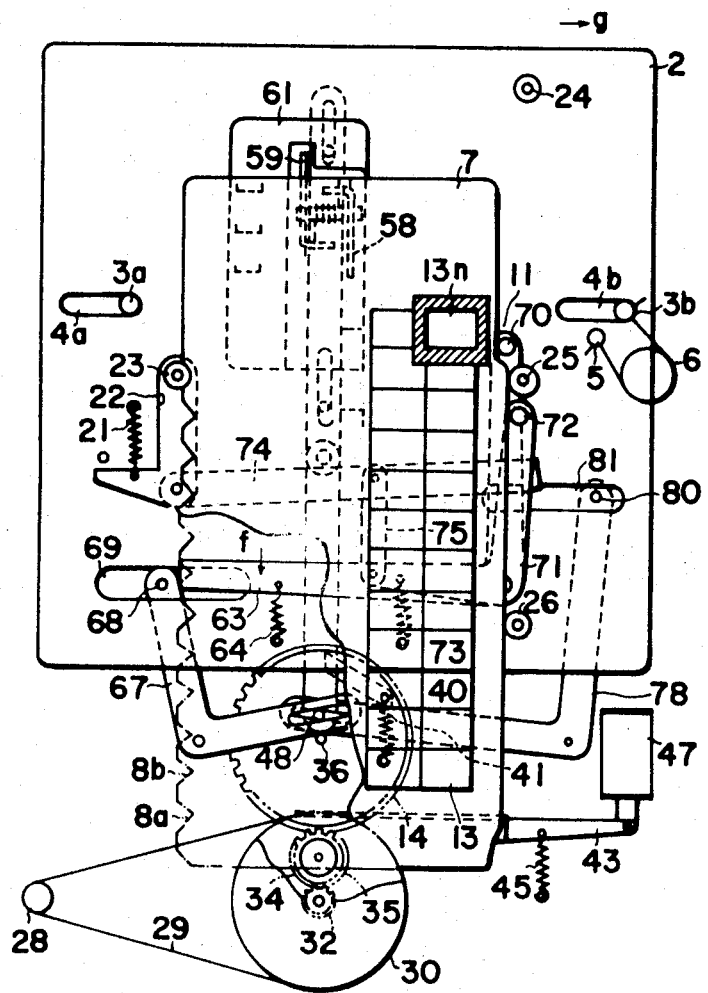

When the magazine 7 has been located in a position to have the last frame of the film 13 projected, as a result of the frames of the film 13 having been shifted and projected one after another on every motion of the solenoid plunger 47, the pin 70 of the lever 63 comes off the elongate projection 9 and rests on the recessed portion 11 of the longitudinal edge of the magazine 7 as shown in FIG. 3. Namely, the lever 63 makes a pivotal movement in the direction of the arrow f under the biasing force of the spring 64 and one end thereof is located in a position engageable with the pin 68.

The last frame 13n of the film 13 is projected in this state and then the solenoid plunger 47 is actuated. In this case, the driving pawls 58, 59 are caused to make one reciprocal motion respectively but the magazine 7 is not moved by said pawls because the oblique projections cooperating with the driving pawl 58 are provided in a number required to bring the last frame 13n of the film 13 to the position of the mask 27 or in a number one less than the number of the frames, as stated previously.

By the pivotal movement of the lever 67, caused by the rotation of the gear 37, the pin 68 engages one end of the lever 63 causing said lever 63 to move to the right. Therefore, the movable plate 2 is also urged to the right against the biasing force of the spring 6 as indicated by the arrow g and, when the rightward force exerted on the movable plate 2 has exceeded the biasing force of the spring 6, the movable plate 2 is brought to the position shown in FIG. 4 and stably held in the position under the biasing force of the same spring 6.

The movement of the movable plate 2 causes displacement of the films 13, 14 and the frame 14a of the film 14 is brought into the position of the mask 27 to be projected. At the same time, the series of oblique projections 17a, 17b, 17c — are moved off the position of engagement with the driving pawl 58 and instead the series of oblique projections 18a, 18b, 18c — are brought into the position of engagement with the driving pawl 59.

Then, the solenoid plunger 47 is actuated, whereupon the driving pawl 59 engages the oblique projection 18a and pulls the same on the return stroke of its reciprocal motion, causing the magazine 7 to shift in a direction opposite to the direction of the arrow e.

Upon shifting of the magazine 7, the frame 14b of the film 14 is placed in the position of the mask 27 and projected successively after the frame 14a.

Figure 4:
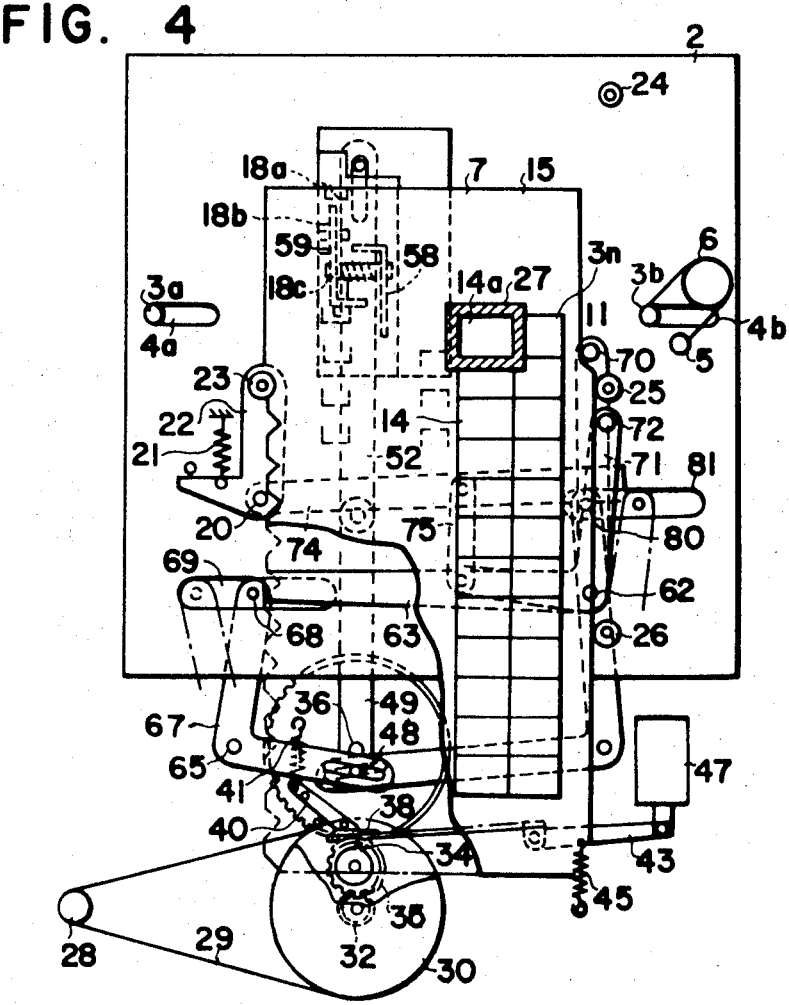

Incident to the operation of the solenoid plunger 47, the pin 68 on the lever 67 is caused to make a lateral reciprocal motion by the rotation of the gear 37 but such reciprocal motion takes place only in the space leftwardly of the tip end of the lever 63, as shown in FIG. 4, without giving any influence on the other parts.

Similarly, the pin 80 on the lever 78 also makes a reciprocal motion concurrently but the motion of the lever 78 does not have any affect on the other parts because the lever 74 is pushed up by the lever 71 and held out of engagement with the pin 80.

As the magazine 7 is shifted upon completion of projection of the frame 14a of the film 14, the pin 70 of the lever 63 rises onto the elongate projection 9 from the recessed portion 11 of the magazine 7, so that the lever 63 is caused to make a pivotal movement against the biasing force of the spring 64 and moved further away from the lever 67.

Figure 5:
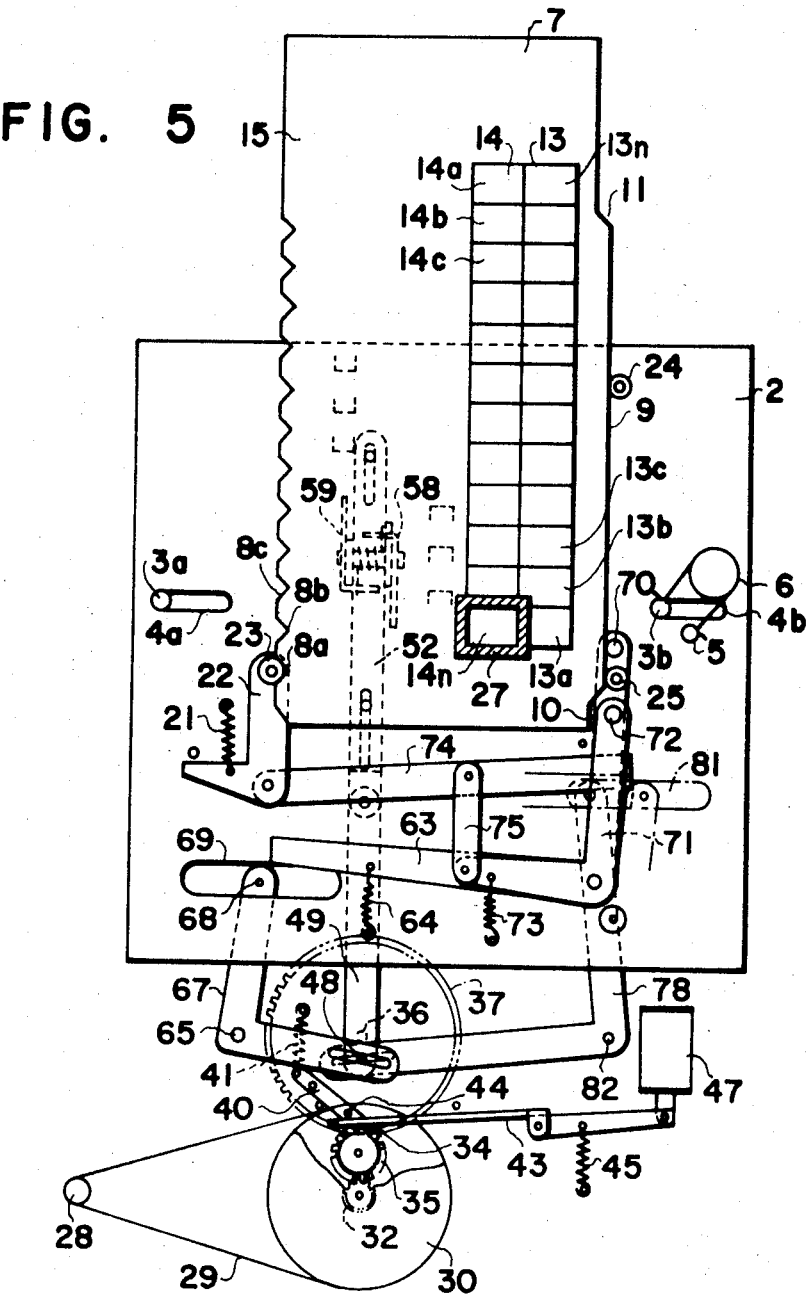

Thereafter, the frames of the film 14 are projected one after another successively as the magazine 7 is shifted upwardly by the action of the solenoid plunger 47. When the magazine 7 is placed in the position of projecting the last frame 14n of the film 14, as shown in FIG. 5, the pin 72 of the lever 71 is located in a position opposite to the recessed portion 10 of the magazine 7 but is held against engagement with said recessed portion 10 because the lever 74 is engaged by the pin 80 of the lever 78 and the lever 71 is held in the state of being pivotally moved against the biasing force of the spring 73.

When the solenoid plunger 47 is actuated under such condition, the driving pawl 59 has no oblique projection to engage and the magazine 7 is held immovably. By the rotation of the gear 37, the lever 78 is caused to make a pivotal movement in a clockwise direction and thus the pin 80 of said lever 78 is released from engagement with the lever 74, allowing said lever 74 to return to the original position. The lever 71 is pulled by the spring 73 and the pin 72 thereon is brought into engagement with the recessed portion 10 of the magazine 7.

By the latter half revolution of the gear 37, the lever 78 is caused to make a pivotal movement in a counterclockwise direction and the pin 80 thereon engages the end of the lever 74 and pushes the same, so that the movable plate 2 is moved in a direction opposite to the direction of the arrow g in FIG. 3, against the biasing force of the spring 6, and returned to its original position shown in FIG. 1.

It is to be noted that when the driving pawls 58, 59 ride over the oblique projections 17a, 17b, 17c — and 18a, 18b, 18c — respectively, in the operation of shifting the magazine 7 by said driving pawls, the driving pawls themselves rotate downwardly against the biasing force of the spring 60, ensuring smooth passage of the pawls over the oblique projections.

It is also to be noted that the sliding lever 52, carrying the driving pawls 58, 59 thereon, is movable downwardly by the operation of a lever (not shown), so that the driving pawls 58, 59 may be held out of engagement with the oblique projections where it is desired to move the magazine 7 in a direction opposite to the direction in which said magazine is shifted by said driving pawls.

Although in the embodiment described and illustrated herein the projector comprises two driving pawls 58, 59, it should be understood that the projector may be constructed with only one driving pawl, based upon the same principle as illustrated herein.

What is claimed is:

1. A device for advancing frames of film in a projector, comprising:

a base member;

a movable plate slidably mounted for movement in a first direction with respect to said base member;

a film container slidably mounted for movement on said movable plate in second and third directions substantially perpendicular to the first direction of movement of said movable plate, one surface of said container having a plurality of rows of ratchet-like projections thereon, said rows extending in said second direction with the ratchet-like projections of one row facing the opposite direction from the ratchet-like projections of another of said rows, the film being held in said container such that the frames of the film extend in rows parallel to said rows of projections;

driving pawl means for engaging at least one of said ratchet-like projections in one selected row of said projections, for advancing said container in one of said second and third directions to index successive frames of said film into a position for optically projecting said frames;

means for driving said driving pawl means, including a slidably mounted driving member, one end portion of said driving member being coupled to said driving pawl means, a rotatable toothed gear wheel coupled to the other end portion of said member for reciprocating said driving member, a toothed gear driving wheel adapted to engage said rotatable toothed gear wheel, and means for engaging said rotatable toothed gear wheel with said driving gear wheel and disengaging said gear wheels after one revolution of said rotatable toothed gear wheel; and means coupled to said rotatable toothed gear wheel for moving said movable plate in said first direction from a first position, wherein said driving pawl means is engageable with a projection in one of said rows to drive said container in said second direction, to a second position, wherein said driving pawl means is engageable with a projection in another of said rows during one selected revolution of said rotatable toothed gear wheel to drive said container in said third direction.

2. The device of claim 1, wherein the movable plate slidably mounted for movement in a first direction with respect to said base member has a plurality of slots therein, the axes of said slots aligned in said first direction;

said base member has a plurality of pins thereon engageable in the slots in said movable plate; and a biasing means is connected between said base member and said movable plate for maintaining said movable plate in one of two positions with respect to said base member, said two positions being the extremities of the path along which said movable plate may move with respect to said base member.

3. The device of claim 1, wherein said means for engaging and disengaging said gear wheels comprises:

a pawl lever pivotally mounted on a side face of the rotatable toothed gear wheel and biasing means biasing one end of said pawl lever toward a projection on a side face of said driving gear wheel;

an actuating lever pivotally mounted on said base member, one end of said actuating lever engageable with the end of said pawl lever which is biased toward said projection on said driving gear wheel, and another biasing means biasing said end of said actuating lever away from said projection on said driving gear wheel for maintaining said pawl lever out of engagement with said projection on said driving wheel;

means for moving said end of said actuating lever toward said driving gear wheel out of engagement with said pawl lever whereby the end of said pawl lever is engageable with said projection on said driving gear wheel for initiating engagement of said driving gear wheel with said rotatable toothed gear wheel; and said rotatable toothed gear wheel has a plurality of gear teeth missing at its periphery near the extension of the radius of said rotatable wheel which includes the point at which the crank arm is engaged with said rotatable wheel, said missing teeth forming a recess in the periphery of said rotatable wheel for disengaging said rotatable wheel from the driving gear wheel.

4. The device of claim 1 additionally comprising:

a crank arm coupling said other end of said slidably mounted driving member with said rotatable toothed gear wheel;

a first L-shaped lever pivotally mounted near its elbow to the base member, one end of said lever having a slot therein engaged by a pin on a side surface of said rotatable wheel, said pin also engaging the end of said crank arm, the opposite end of said first lever having a pin therein;

a second L-shaped lever pivotally mounted near its elbow to the movable plate, one end of said second lever engageable with said pin in said opposite end of said first lever, and the opposite end of said second lever engageable with a first longitudinal edge of said container;

a third L-shaped lever pivotally mounted near its elbow to the base member, said third lever located on the diametrically opposite side of said rotatable wheel from said first lever, and one end of said third lever having a slot therein engaged by said pin on said rotatable wheel, the opposite end of said third lever having a pin therein;

a fourth lever extending transversely across the width of said container, one end of said fourth lever engageable with the pin on the opposite end of said third lever, and the opposite end of said fourth lever terminating near the second longitudinal edge of said container;

a fifth lever pivotally mounted to the opposite end to said fourth lever, and one end of said lever biased into engagement with the second longitudinal edge of said container by a first biasing means;

a sixth L-shaped lever pivotally mounted near its elbow to the movable plate at the same point at which said second lever is pivotally mounted to said movable plate, one end of said sixth lever engaging the first longitudinal edge of said container, and the opposite end of said sixth lever pivotally connected to said fourth lever through a linkage member which is pivotally mounted to said fourth lever so that the axis of said linkage member is approximately parallel to the longitudinal edges of said container;

the first longitudinal edge of said container having a straight camming surface thereon which is about as long as the aperture in said container and which is recessed at its ends, said camming surface and recessed ends engageable with one end of each of said second and sixth levers, and the second longitudinal edge of said container having an evenly spaced series of notches therein for engagement with a roller mounted on first end of said fifth lever.

5. The device of claim 4, additionally comprising:

a second biasing means urging the opposite ends of said second lever toward the opposite end of said first lever; and a third biasing means biasing the opposite end of said second lever in a direction away from said fourth lever.

6. The device of claim 1, wherein said driving pawl means comprises:

a first driving pawl for engaging the ratchet-like projections in one row of said projections which face said first driving pawl, for advancement of said container during said first 180° of rotation of said rotatable wheel; and a second driving pawl for engaging the ratchet-like projections of another row of said projections facing the opposite direction from the ratchet-like projections of said first row for engaging said second pawl for advancement of said container in the opposite direction during the second 180° of rotation of said rotatable wheel.

* * * * *